(12) United States Patent
Leoka et al.

(10) Patent No.: US 9,937,927 B2
(45) Date of Patent: Apr. 10, 2018

(54) SYSTEM FOR PREVENTING DAMAGING OF A GEAR BOX OF A VEHICLE PROVIDED WITH A CLUTCH-SERVO AND A SERVO-SHIFT ACTUATED GEAR BOX SYSTEM

(71) Applicant: IVECO MAGIRUS AG, Ulm (DE)

(72) Inventors: Georg Leoka, Ulm (DE); Georg Waiblinger, Gilching (DE); Harald Pohl, Erbach (DE); Ralf Gaessler, Ulm (DE)

(73) Assignee: IVECO MAGIRUS AG, Ulm (DE)

( * ) Notice: Subject to any disclaimer, the term of this patent is extended or adjusted under 35 U.S.C. 154(b) by 349 days.

(21) Appl. No.: 14/770,017

(22) PCT Filed: Feb. 27, 2014

(86) PCT No.: PCT/EP2014/053849
§ 371 (c)(1),
(2) Date: Aug. 24, 2015

(87) PCT Pub. No.: WO2014/131840
PCT Pub. Date: Sep. 4, 2014

(65) Prior Publication Data
US 2016/0009285 A1  Jan. 14, 2016

(30) Foreign Application Priority Data
Feb. 28, 2013  (EP) ..................................... 13157151

(51) Int. Cl.
*B60W 30/184*  (2012.01)
*F16D 48/04*  (2006.01)
(Continued)

(52) U.S. Cl.
CPC ........ *B60W 30/1846* (2013.01); *B60W 10/02* (2013.01); *B60W 10/11* (2013.01);
(Continued)

(58) Field of Classification Search
None
See application file for complete search history.

(56) References Cited

U.S. PATENT DOCUMENTS 4,796,739 A * 1/1989 Jonner .................. B60T 8/3215
192/13 R
5,634,867 A   6/1997 Mack
(Continued)

FOREIGN PATENT DOCUMENTS

DE     4439447     3/1996

OTHER PUBLICATIONS

PCT International Search Report and Written Opinion dated May 13, 2014 for PCT International Application No. PCT/EP2014/053849.

*Primary Examiner* — Jacob S. Scott
(74) *Attorney, Agent, or Firm* — RMCK Law Group, PLC

(57) ABSTRACT

The present invention provides for a method and apparatus for preventing damaging of a gear box of a vehicle provided with a servo-actuated clutch system and a servo-actuated gear shift system, the servo-actuated clutch comprising a clutch-servo housing a pneumatic piston, movable between a first and a second positions corresponding to an open and a closed system of the clutch. The functioning of servo-actuated gear shift system is enabled when the pneumatic piston position exceeds, toward said disengagement state, a third predefined position.

12 Claims, 2 Drawing Sheets

(51) Int. Cl.
  *F16H 59/56*   (2006.01)
  *F16H 61/16*   (2006.01)
  *F16H 63/40*   (2006.01)
  *B60W 10/02*   (2006.01)
  *B60W 10/11*   (2012.01)

(52) U.S. Cl.
  CPC .............. *F16D 48/04* (2013.01); *F16H 59/56* (2013.01); *F16H 61/16* (2013.01); *F16H 63/40* (2013.01); *B60W 2510/0225* (2013.01); *B60W 2540/14* (2013.01); *F16D 2500/5016* (2013.01)

(56) References Cited

U.S. PATENT DOCUMENTS

| | | | | |
|---|---|---|---|---|
| 5,957,806 | A * | 9/1999 | Hirose | B60W 30/18 192/3.58 |
| 6,052,637 | A | 4/2000 | Amsallen | |
| 6,250,203 | B1 * | 6/2001 | Mischler | B60T 11/16 92/5 R |
| 2010/0041515 | A1 | 2/2010 | Ohkubo | |

\* cited by examiner

SYSTEM FOR PREVENTING DAMAGING OF A GEAR BOX OF A VEHICLE PROVIDED WITH A CLUTCH-SERVO AND A SERVO-SHIFT ACTUATED GEAR BOX SYSTEM

CROSS-REFERENCE TO RELATED APPLICATIONS

This application is a 371 U.S. National Stage of International Application No. PCT/EP2014/053849, filed Feb. 27, 2014, which claims priority to European Application No. 13157151.5 filed on Feb. 28, 2013. The disclosure of each of the above applications is incorporated herein by reference in their entirety.

FIELD OF THE INVENTION

The present invention relates to the field of vehicles provided with a clutch-servo system and a servo-shift system.

Examples of the prior art system are given in U.S. Pat. No. 6,052,637 and U.S. Pat. No. 5,634,867, whose features are in the preamble of claim 1.

DESCRIPTION OF THE PRIOR ART

The clutch-servo assembly usually comprises a hydraulic circuit and a pneumatic circuit.

In particular the clutch-servo is actuated by transmission of oil pressure from a master-cylinder activated by a complete actuating of a clutch pedal.

The hydraulic circuit comprises a hydraulic piston on the master-cylinder, hydraulically connected with the clutch-servo, so the oil pressure is transferred to the piston of the clutch-servo.

The clutch-servo is also connected to a pneumatic circuit in order to exploit the pneumatic energy and to minimize the necessary human force to actuate the clutch. A piston operates the clutch by using both energy types, namely compressed air and pressure of hydraulic oil.

When the driver does not push the clutch pedal completely down, the clutch could not be completely open.

In addition, the same situation could happen when the hydraulic circuit of the clutch-servo actuated clutch imprisons air. This means that air bubbles are present in the hydraulic pipelines. Therefore, despite the fact that the driver has actuated the clutch pedal correctly, the clutch is not open because of the presence of air bubbles.

This could happen when the clutch disks are replaced in a workshop but the hydraulic pipeline was not vented completely.

Therefore, the complete pressing of the clutch pedal does not correspond to the complete disengagement of the clutch. This could also happens due to the ageing of the clutch-servo-mechanism itself.

When the vehicle is also provided with a servo-actuated gear-shift that is manually actuated, the forces developed by its servo-mechanism are considerable. This means that if the clutch is not completely open, the internal components of the gear box, such as the synchronizers, will be damaged.

SUMMARY OF THE INVENTION

Therefore it is a main object of the present invention to provide a system for preventing damaging of a gear box of a vehicle provided with a servo-actuated clutch and a servo-actuated gear shift which overcomes the above problems/drawbacks.

A main principle of the invention is the insertion of a sensor within the clutch-servo actuator that is able to detect a position of a pneumatic piston in order to enable or not the activation of the servo-actuated gear shift, independently from the intentions of the driver.

According to a preferred embodiment of the present invention, approval to the servo-actuated gear shift is given when the clutch-servo's piston is at least at 70%-80% of its overall displacement towards the opening actuation of the clutch.

According to the present invention, a further sensor is installed at the pedal side, for example within the master-cylinder, in order to actuate the clutch-servo and additionally directly or indirectly to detect the pedal position. In this way, when the clutch pedal is detected as to be completely pressed, while the clutch-servo's piston does not reach/exceed such minimum displacement, then, not only the gear-shift mechanism is inhibited from operating, but this also invites to carry out the venting of air form the hydraulic circuit of the servo-actuated clutch.

Thanks to the present invention, the damaging of the gearbox is prevented.

These and further objects are achieved by means of an apparatus and method as described in the attached claims, which form an integral part of the present description.

BRIEF DESCRIPTION OF THE DRAWINGS

The invention will become fully clear from the following detailed description, given by way of a mere exemplifying and non limiting example, to be read with reference to the attached drawing figures, wherein FIG. 1 shows schematically a servo-actuated push-type clutch, while

The same reference numerals and letters in the figures designate the same or functionally equivalent parts.

DETAILED DESCRIPTION OF THE PREFERRED EMBODIMENTS

Figure 1:
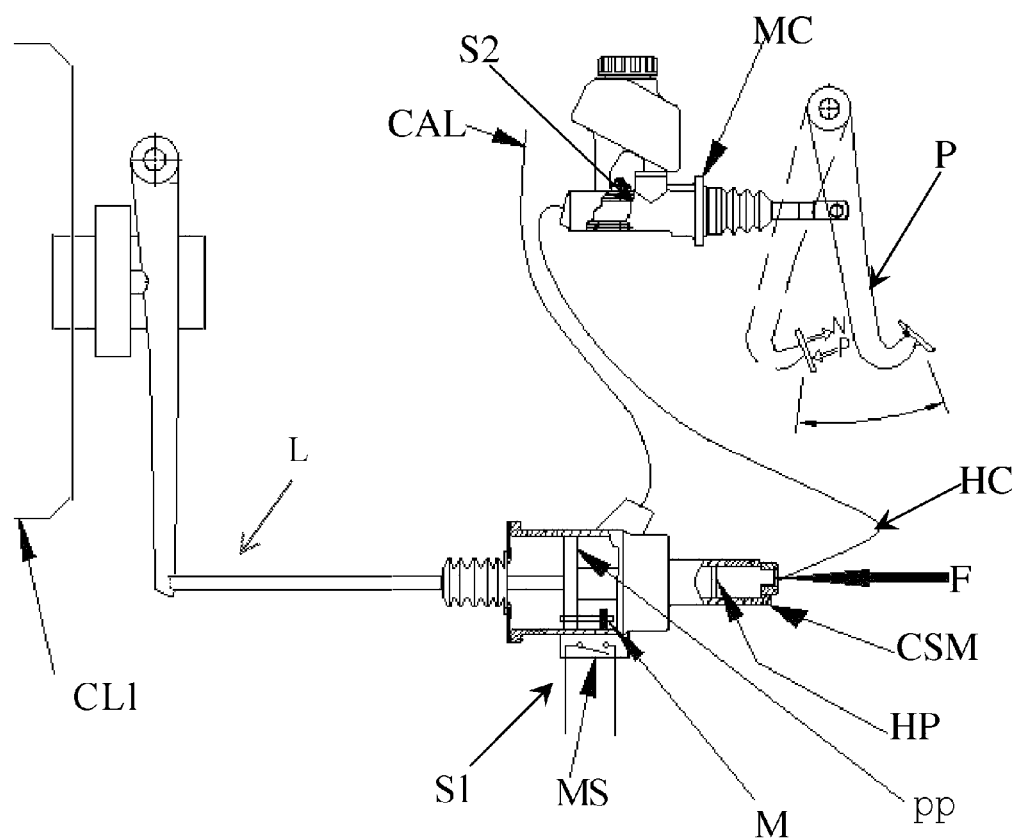
Figure 2:
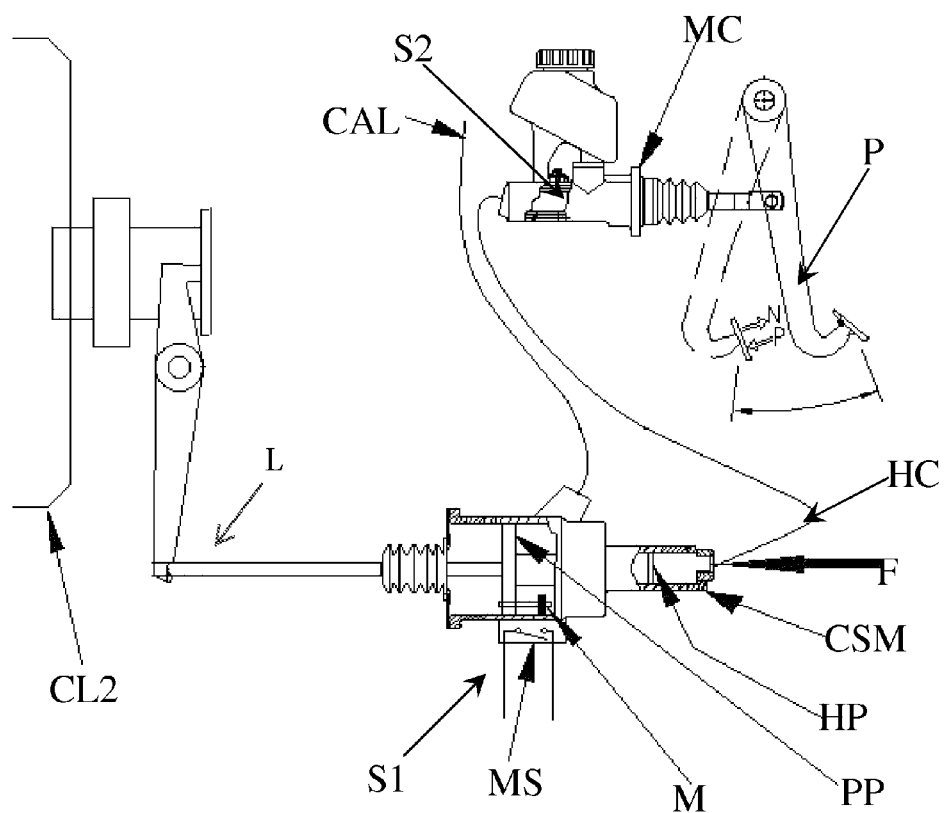
FIG. 2 shows schematically a servo-actuated pull-type clutch.

On FIG. 1 is shown a push-type of clutch CL1 and on FIG. 2 is shown a pull type CL2 of clutch respectively having an actuating lever L. The lever L is connected with the piston PP, which is actuated pneumatically and hydraulically, of the clutch-servo-mechanism CSM.

Within the clutch-servo CSM is housed a piston including a hydraulic area HP, which is hydraulically connected through an hydraulic circuit HC to the master-cylinder MC. The master cylinder, that is substantially an hydraulic pump, is operatively connected with the clutch pedal P.

The clutch-servo's piston on the compressed air area CSM is also connected with a compressed air source through a compressed air line CAL.

According to the present invention, the clutch-servo CSM comprises a sensor S1 able to detect the position of the pneumo-hydraulic PP.

The signal from sensor S1 is fed to a control unit which allows/denies the functioning of a servo-shift of a gear box, not shown.

According to a preferred embodiment of the present invention, the sensor S1 will transmit an electric signal when a magnetic or metal component M, fixed on the pneumo-hydraulic piston PP, has reached at least a pre-defined position indicating the operatively opening of the coupled clutch.

According to a preferred embodiment of the invention, the sensor S1 is coupled with a mechanism, per se known, that automatically accounts for the wear of clutch disks.

In this case the O-position (zero) has to be reset at the replacement of the clutch disks with new ones.

According to a preferred embodiment of the invention, when the displacement of the piston PP is between 70% and 80% of the total displacement, the clutch is considered to be open.

A sensor MS, represented as an electric switch, is fixed or integrated on the clutch-servo CSM and disposed outside of the clutch-servo in order to detect the position of the piston PP and to transmit the electric signal.

The main advantage of using a sensor is that there are no electric wires crossing the walls of the pneumatic piston chamber. In fact, the pressures are very high, and it is very difficult to assure a suitable chamber sealing.

Preferably, the switch closes an electric circuit when the piston is at least in a preferred position, namely a minimum displacement. Preferably, the electric circuit is closed, namely the gear shift functioning is enabled, when the piston is at least between 70% and 80% of the overall displacement of the piston towards the opening/disengagement of the clutch CL.

It is known that the clutch can be considered as open/disengaged only when the pneumo-hydraulic piston does reaches the end of its displacement. Therefore, such pre-defined position, corresponding to the position of the sensor MS, discriminates between enabling and disabling of the gear-shift system and is appropriately chosen between extreme positions of the pneumatic piston.

According to the present invention, when, for any reason, the clutch is supposed to be engaged, due to said sensor S1, the activation of the servo-shift of gear box is inhibited in order to prevent any damage for the gear box.

According to a further preferred embodiment, a further sensor S2 is installed at the master-cylinder on clutch pedal side, for example within the master cylinder MC in order to directly or indirectly detect the pedal position in order to transmit an electric signal to the cruise control. When the system detects that the clutch pedal P is pressed, while the piston PP does not reach such minimum displacement, namely a third position intermediate between two extreme positions, then, not only the servo-shift of gear box mechanism is inhibited from operating, but also, a message to carry out the venting of air from the hydraulic circuit HC of the servo-actuated clutch is displayed.

For example, the message may be displayed through a light or by means of the on-board computer.

According to a preferred embodiment of the invention, the value or the lack of the electrical signal produced by the sensor S1 denies the on-board CPU to carry out an assisted gear shifting procedure, usually, as long as the master-cylinder is not sufficiently/correctly operated in terms of opening of the clutch, or as long as air needs to be vented from the hydraulic circuit.

This invention can be implemented advantageously in a computer program comprising program code means for performing one or more steps of such method, when such program is run on a computer. For this reason the patent shall also cover such a computer program and the computer-readable medium that comprises a recorded message, such computer-readable medium comprising the program code means for performing one or more steps of such method, when such program is run on a computer.

Many changes, modifications, variations and other uses and applications of the subject invention will become apparent to those skilled in the art after considering the specification and the accompanying drawings which disclose preferred embodiments thereof. All such changes, modifications, variations and other uses and applications which do not depart from the spirit and scope of the invention are deemed to be covered by this invention.

Further implementation details will not be described, as the man skilled in the art is able to carry out the invention starting from the teaching of the above description.

The invention claimed is:

1. A method for preventing damaging of a gear box of a vehicle provided with a servo-actuated clutch system and a servo-actuated gear shift system, the servo-actuated clutch system comprising a clutch-servo (CSM) housing a pneumo-hydraulic piston (PP), movable between a first and a second positions corresponding to an open and a closed condition of the clutch, the method comprising the step of enabling the functioning of the servo-actuated gear shift, when the pneumo-hydraulic piston (PP) position exceeds, toward said first position, a third predefined intermediate position and characterized in comprising the step of detecting the clutch pedal (P) position, and the step of forwarding a message when said pneumatic piston (PP) does not exceeds said third position when the clutch pedal (P) is detected as completely pressed.

2. The method according to claim 1, further comprising the preliminary step of detecting the position of the pneumatic piston (PP).

3. The method according to claim 1, wherein said third predefined position is at least 70%-80% of the overall displacement of the piston towards the opening/disengagement of the clutch (CL).

4. A computer program comprising computer program code means adapted to perform all the steps of claim 1, when said program is run on a computer.

5. A computer readable medium having a program recorded thereon, said computer readable medium comprising computer program code means adapted to perform all the steps of claim 1, when said program is run on a computer.

6. A system for preventing damaging of a gear box of a vehicle provided with a servo-actuated clutch system and a servo-actuated gear shift system, the servo-actuated clutch system comprising a clutch-servo (CSM) housing a pneumatic piston (PP), movable between a first and a second positions corresponding to an open and a closed condition of the clutch; the system comprising:
  means (S1), coupled with said clutch-servo, capable to detect the position of the piston,
  means for detecting the clutch pedal (P) position,
  control means adapted to enable the functioning of the servo-actuated gear shift system when the pneumo-hydraulic piston (PP) position exceeds, toward said first position, a third predefined position and for forwarding a message when said pneumatic piston (PP) does not exceed said third position when the clutch pedal (P) is detected as completely pressed.

7. The system according to claim 6, further comprising first means (S1) for detecting the position of the pneumo-hydraulic piston (PP).

8. The system according to claim 6, wherein said third predefined position is at least 70%-80% of the overall displacement of the piston towards the opening/disengagement of the clutch (CL).

9. The system according to claim 6, further comprising second means (S2) for detecting the clutch pedal (P) position, and means for displaying a message when said pneumo-hydraulic piston (PP) does not reach said second position when the clutch pedal (P) is completely pressed.

10. The system according to claim 6, wherein the clutch is of the push-type or pull-type.

11. The system according to claim 8, wherein said first detecting means (S1) comprises a magnetic portion (M), fixed with the pneumo-hydraulic piston (PP) and a sensor (MS) fixed or integral with the clutch-servo (CSM) for detecting the position of the pneumo-hydraulic piston (PP).

12. The system according to claim 11, wherein said sensor (MS) is disposed outside of a chamber in which the pneumo-hydraulic piston (PP) is able to slide.

\* \* \* \* \*